United States Patent
Lien et al.

(10) Patent No.: US 7,694,920 B2
(45) Date of Patent: Apr. 13, 2010

(54) DISPLAY APPARATUS HAVING HEIGHT ADJUSTING DEVICE

(75) Inventors: Chih-Huang Lien, Miao-Li (TW); Shi-Liang Li, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 12/082,764

(22) Filed: Apr. 14, 2008

(65) Prior Publication Data
US 2008/0251678 A1    Oct. 16, 2008

(30) Foreign Application Priority Data
Apr. 13, 2007  (CN) ................ 2007 1 0074021

(51) Int. Cl.
A47F 5/00 (2006.01)
A47F 7/00 (2006.01)
F16M 11/00 (2006.01)
F16M 13/00 (2006.01)

(52) U.S. Cl. .............. 248/125.8; 248/917; 248/918; 248/919; 248/920; 248/921; 248/922; 248/923; 248/158; 248/161; 248/407; 248/159; 248/125.1; 361/679.06; 361/679.21; 361/679.22

(58) Field of Classification Search ........... 248/917, 248/918, 919, 920, 921, 922, 923, 125.8, 248/158, 161, 407, 159, 125.1; 361/679.06, 361/679.21, 679.22
See application file for complete search history.

(56) References Cited

U.S. PATENT DOCUMENTS

| 6,796,537 | B1 * | 9/2004 | Lin ........................ 248/162.1 |
| 6,994,306 | B1 * | 2/2006 | Sweere et al. .......... 248/295.11 |
| 6,997,422 | B2 * | 2/2006 | Sweere et al. .......... 248/123.11 |
| 7,195,215 | B2 * | 3/2007 | Lin ........................ 248/125.9 |
| 7,392,965 | B2 * | 7/2008 | Jung ...................... 248/176.3 |
| 7,458,549 | B2 * | 12/2008 | Oddsen, Jr. ............ 248/280.11 |
| 7,591,443 | B2 * | 9/2009 | Lee et al. .................. 248/158 |
| 2005/0151043 | A1 * | 7/2005 | Kim et al. ................ 248/274.1 |
| 2005/0194499 | A1 * | 9/2005 | Drew et al. .............. 248/125.1 |
| 2007/0064380 | A1 * | 3/2007 | Shin ......................... 361/681 |
| 2007/0235601 | A1 * | 10/2007 | Yen et al. ................ 248/122.1 |

* cited by examiner

Primary Examiner—J. Allen Shriver, II
Assistant Examiner—Nkeisha J Smith
(74) Attorney, Agent, or Firm—Wei Te Chung

(57) ABSTRACT

An exemplary a display apparatus (2) includes a display panel (21) and a height adjusting device (25). The height adjusting device includes a base (26), a supporting member (27), a locking unit (30), and an elastic member (28). The display panel is fixed to the locking unit. The supporting member is fixed on the base. The supporting member includes two generally vertical friction grooves (2723, 2725). A depth of one of the friction grooves decreases with increasing height above the base, and a depth of the other friction groove increases with increasing height above the base. The locking unit is accommodated in the supporting member. The locking unit includes two sliders (33, 35) corresponding to the two friction grooves of the supporting member respectively. One of the sliders abuts a corresponding one of the friction grooves. The elastic member spans between the locking unit and the base.

18 Claims, 8 Drawing Sheets

DISPLAY APPARATUS HAVING HEIGHT ADJUSTING DEVICE

BACKGROUND

1. Field of the Invention

The present invention relates to a display apparatus including a display panel whose height can be adjusted through a height adjusting device.

2. General Background

Display apparatuses are used in many types of equipment, such as personal computers, navigation systems, notebooks, and so on. In order to provide a better viewing angle for users, a height adjustable function for a display apparatus used with a personal computer is desired.

Referring to FIG. 8 and FIG. 9, a typical display apparatus 1 includes a base 11, a support 12, and a display panel 13. The support 12 is fixed on the base 11, and supports the display panel 13. The stand 13 can adjust a height of the display panel 13 relative to the base 11. The base 11 is substantially disc-shaped, and is positioned on a horizontal surface (not shown) to maintain the stability of the display apparatus 1.

The support 12 includes a tubular body 121, a compression spring 123, a slider 125, a magnet set 127, a ring 129, and a nut 130. The tubular body 121 is located at a center portion (not labeled) of the base 11, and defines an accommodating space therein. The compression spring 123 is accommodated in the accommodating space of the tubular body 121. The slider 125 is fixed at one end of the compression spring 123, and is also accommodated in the accommodating space of the tubular body 121. The ring 129 is fitted around the tubular body 121, and can be moved up or down along the tubular body 121. Two parts of the magnet set 127 are disposed in the slider 125 and the ring 129 respectively, and are spaced by a wall (not labeled) of the tubular body 121. The nut 130 covers a top opening of the tubular body 121, so as to prevent the compression spring 123 and the slider 125 from sliding out from the tubular body 121.

The display panel 13 is configured to display, e.g., images or videos. The display panel 13 is fixed to the ring 129 through bolts (not labeled), and can be moved up and down with the ring 129 along the tubular body 121.

The operation principle of the display apparatus 1 is as follows. Because the two parts of the magnet set 127 are attractive to each other and are disposed in the slider 125 and the ring 129 respectively, the slider 125 and the ring 129 clamp the wall of the tubular body 121 due to an attraction force between the two parts of the magnet set 127. Friction forces are generated, between the slider 125 and the wall of the tubular body 121 and between the ring 129 and the wall of the tubular body 121. At the same time, the compression spring 123 generates an elastic force to support the slider 125 and push the slider 125 upward. By adjusting the elastic force and the friction forces, the elastic force, the friction forces, and gravity acting on the display panel 13 can cooperatively keep the display panel 13 steady at a desired height.

When lifting the display panel 13, an upward external force is applied to the display panel 13. If a sum of the external force and the elastic force is greater than a sum of the friction forces and the force of gravity, the display panel 13 can be lifted to a higher position. When the external force is removed, the display panel 13 stays at the higher position because directions of the friction forces are reversed. When lowering the display panel 13, a downward external force is applied to the display panel 13. If a sum of the external force and the force of gravity is greater than a sum of the elastic force and the friction forces, the display panel 13 can be lowered to a lower position. When the external force is removed, the display panel stays at the lower position because directions of the friction forces are reversed.

However, in order to achieve the height adjustable function of the display panel 13, the display apparatus 1 needs the magnet set 127 to generate the friction forces. Therefore the display apparatus 1 has a rather complicated structure. In addition, a process of adjustment and calibration of the magnet set 127 is needed in order to achieve suitable attraction force. This makes a process of fabricating the display apparatus 1 somewhat complicated.

Therefore, a new display apparatus that can overcome the above-described problems is desired.

SUMMARY

In one preferred embodiment, a display apparatus includes a display panel and a height adjusting device for adjusting a height of the display panel. The height adjusting device includes a base, a supporting member, a locking unit, and an elastic member. The display panel is fixed to the locking unit. The supporting member is fixed on the base and defines an accommodating space. The supporting member includes two generally vertical friction grooves. A depth of one of the friction grooves decreases with increasing height above the base, and a depth of the other friction groove increases with increasing height above the base. The locking unit is accommodated in the accommodating space of the supporting member. The locking unit includes two sliders corresponding to the two friction grooves of the supporting member respectively. One of the sliders abuts a corresponding one of the friction grooves. The elastic member is accommodated in the accommodating space of the supporting member, and spans between the locking unit and the base.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
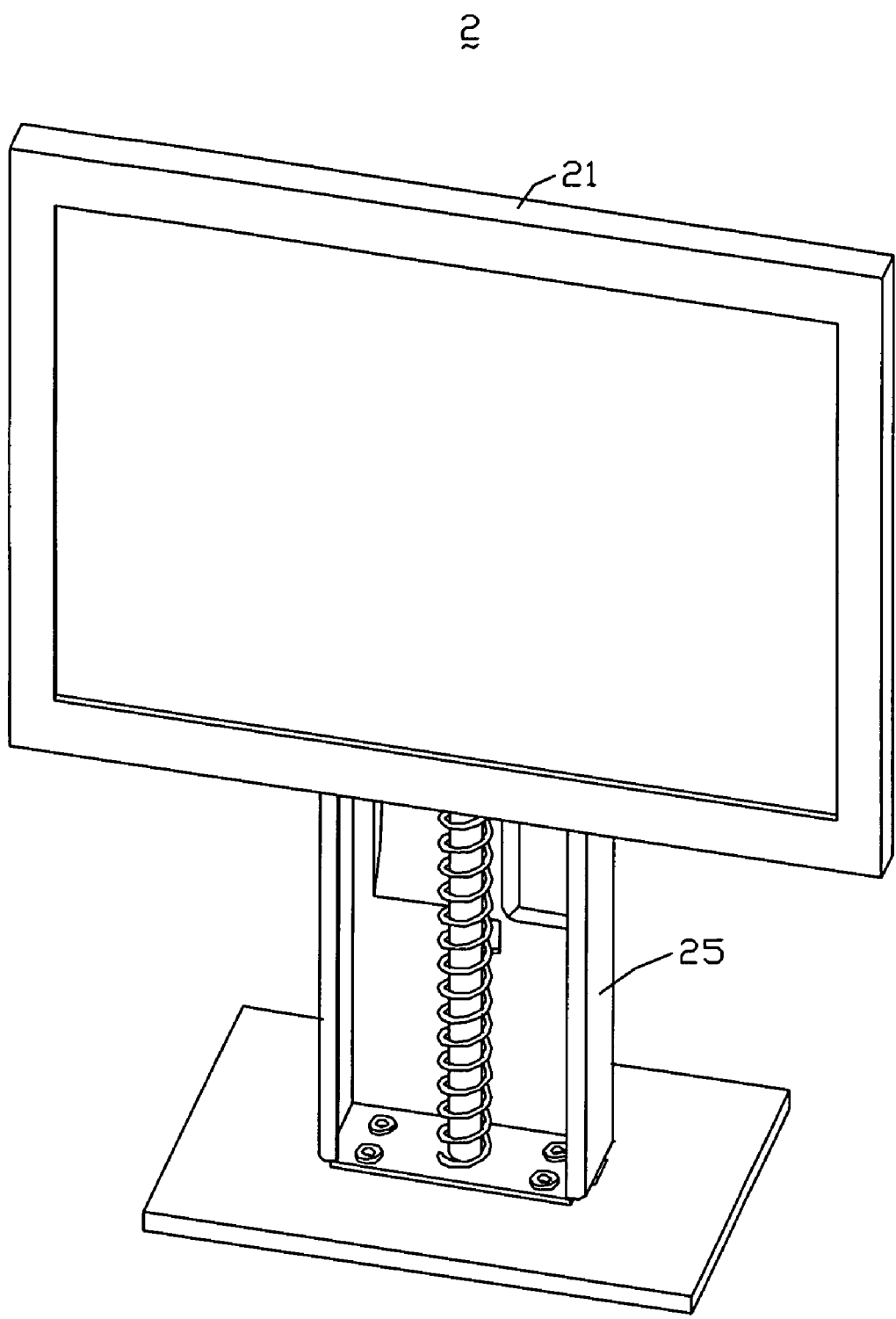
FIG. 1 is an isometric view of a display apparatus according to an exemplary embodiment of the present invention, the display apparatus including a height adjusting device.
Figure 2:
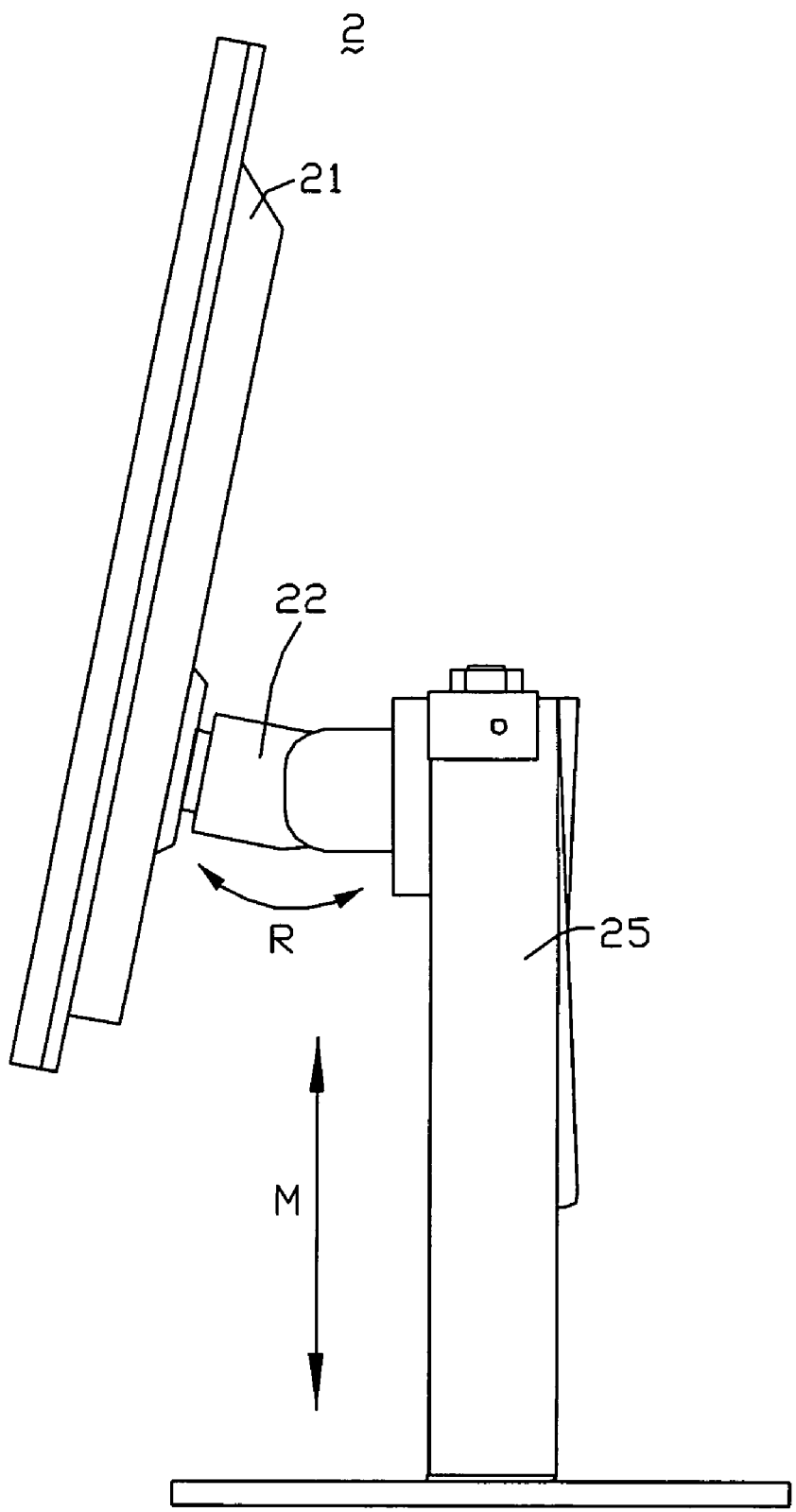
FIG. 2 is a right side plan view of the display apparatus of FIG. 1.

Referring to FIG. 1 and FIG. 2, a display apparatus 2 according to an exemplary embodiment of the present invention is shown. The display apparatus 2 includes a display panel 21, a pivot mechanism 22, and a height adjusting device 25. The pivot mechanism 22 is fixed to the display panel 21 and to the height adjusting device 25 respectively, so that the display panel 21 can be rotated about the pivot mechanism 22. The display panel 21 together with the pivot mechanism 22 can move up and down along the height adjusting device 25. The display panel 21 can be any of various kinds of display panels, such as for example a liquid crystal display panel or a plasma display panel.

Figure 3:
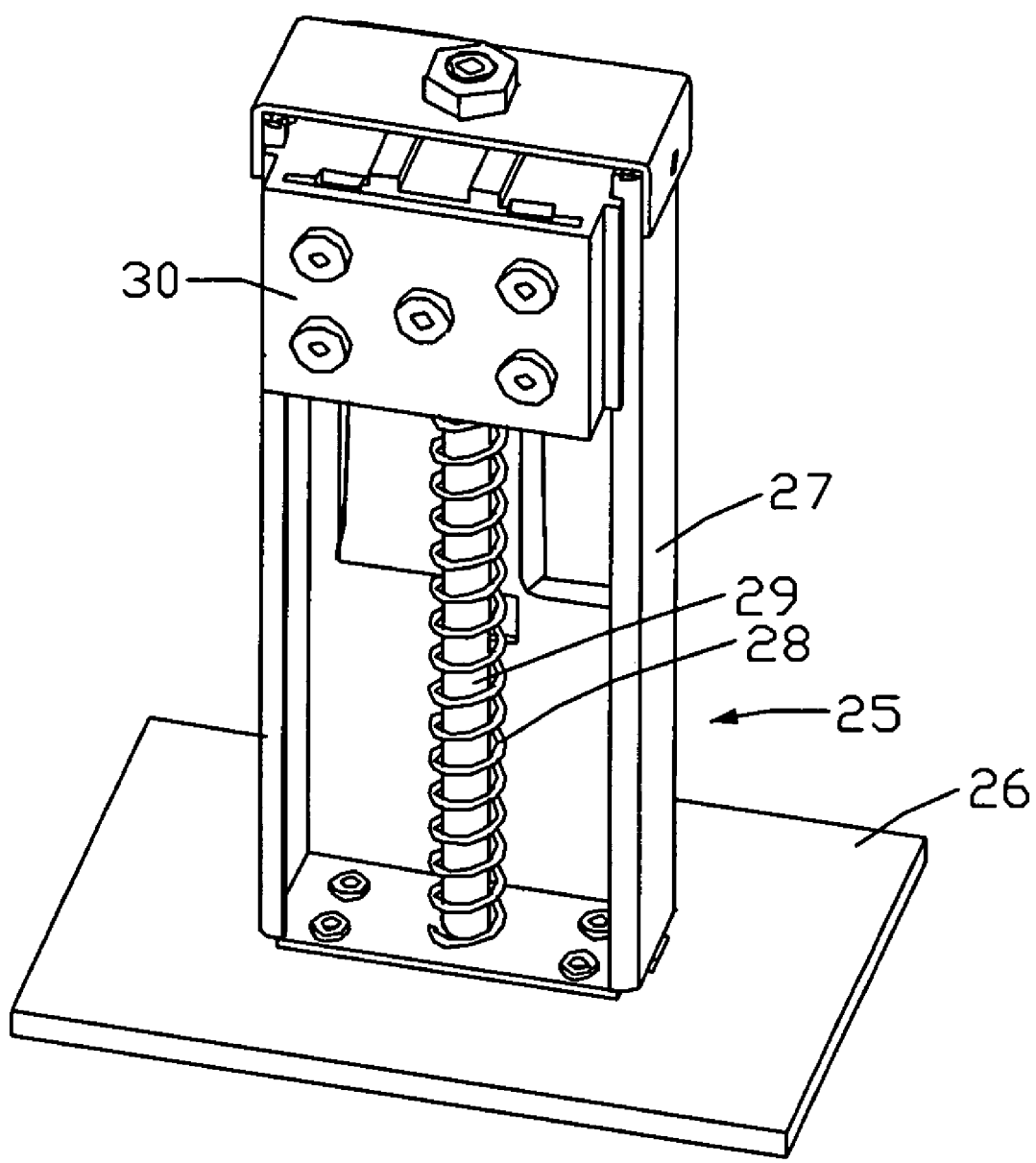
FIG. 3 is an isometric view of the height adjusting device of FIG. 1, the height adjusting device including a locking unit.
Figure 4:
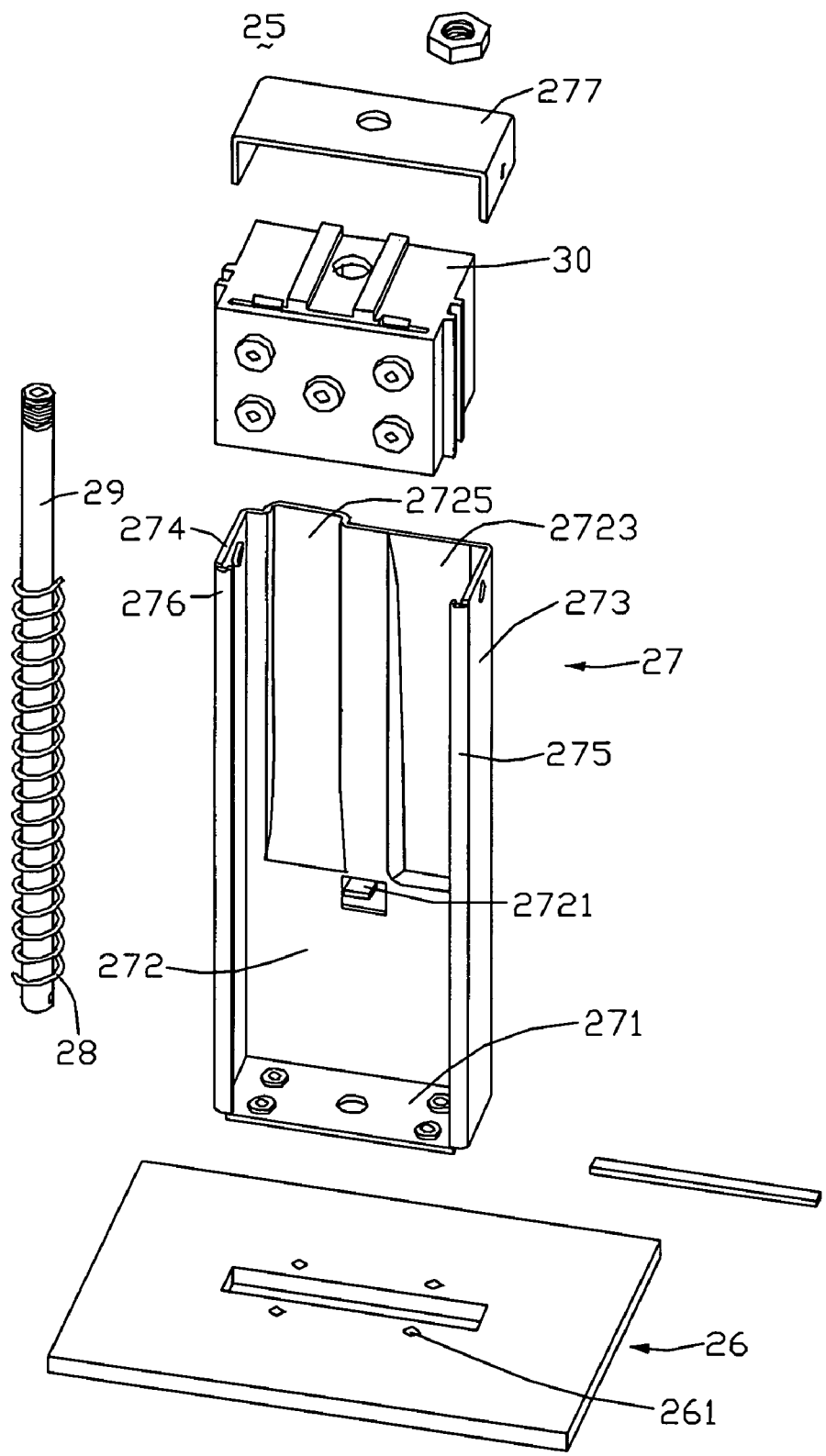
FIG. 4 is an exploded view of the height adjusting device of FIG. 3.

Referring also to FIG. 3 and FIG. 4, the height adjusting device 25 includes a base 26, a support 27, an elastic member 28, a column 29, and a locking unit 30.

The base 26 is a rectangular plate, and is positioned on a horizontal surface (not shown) to maintain the stability of the display apparatus 2. The base 26 includes a plurality of threaded holes 261 in a center portion thereof.

The support 27 is substantially a long box-shaped structure, and is mounted on the base 26 by a plurality of bolts (not labeled) screwed into the threaded holes 261 of the base 26. The support 27 includes a bottom wall 271, a friction wall 272, a first locking wall 273, a second locking wall 274, a first extending wall 275, a second extending wall 276, and a top wall 277. The bottom wall 271 is fixed on the base 26 by the bolts and the threaded holes. The first locking wall 273 is perpendicularly connected with the bottom wall 271. The second locking wall 274 is parallel and opposite to the first locking wall 273. The friction wall 272 is perpendicularly connected with the bottom wall 271 and the first and second locking walls 273, 274. The first extending wall 275 vertically extends from the first locking wall 273 toward the second locking wall 274. The second extending wall 276 vertically extends from the second locking wall 274 toward the first locking wall 273. Thus, the friction wall 272, the first locking wall 273, and the first extending wall 275 cooperatively define a substantially U-shaped first sliding channel (not labeled), and the friction wall 272, the second locking wall 274, and the second extending wall 276 cooperatively define a substantially U-shaped second sliding channel (not labeled). The top wall 277 is parallel and opposite to the bottom wall 271. The top wall 277, the bottom wall 271, the friction wall 272, the first and second locking walls 273, 274, and the first and second extending walls 275, 276 cooperatively define a column-shaped accommodating space (not labeled) having an opening.

The friction wall 272 includes a stopper 2721, a first friction groove 2723, and a second friction groove 2725 parallel to the first friction groove 2723. The stopper 2721 is located near a center portion of an inner surface of the friction wall 272. The first and second friction grooves 2723, 2725 are defined at the inner surface of the friction wall 272, and are substantially located between the stopper 2721 and a top portion of the friction wall 272. The first and second friction grooves 2723, 2725 are both substantially parallel to the first and second locking walls 273, 274. A depth of the first friction groove 2723 (as measured in a horizontal direction) decreases from bottom to top. That is, a horizontal distance between a base surface (not labeled) of the first friction groove 2723 and the first extending wall 275 decreases with increasing height along the support 27. A depth of the second friction groove 2725 (as measured in the horizontal direction) increases from bottom to top. That is, a horizontal distance between a base surface (not labeled) of the second friction groove 2725 and the second extending wall 276 increases with increasing height along the support 27. The base surface of each of the first and second friction grooves 2723, 2725 are slightly curved, but can be considered to essentially define a slight acute angle relative to the vertical.

The elastic member 28 and the column 29 are disposed in the accommodating space of the support 27. One end of the column 29 is fixed at a center portion of the bottom wall 271 of the support 27, and the other end is fixed to a center portion of the top wall 277 of the support 27. Thereby, the column 29 is substantially perpendicular to both the bottom wall 271 and the base 26. The elastic member 28 can for example be a compression spring fitted around the column 29. A bottom end of the elastic member 28 is fixed to the bottom wall 271 of the support 27, and a top and of the elastic member 28 supports the locking unit 30.

The locking unit 30 is substantially box-shaped, and has a size substantially corresponding to an overall width spanned by the first and second sliding channels. The locking unit 30 is also disposed in the accommodating space of the support 27, and is fitted around the column 29. The pivot mechanism 22 is fixed to the locking unit 30, such that the display panel 21 and the locking unit 30 can move up and down together.

Figure 5:
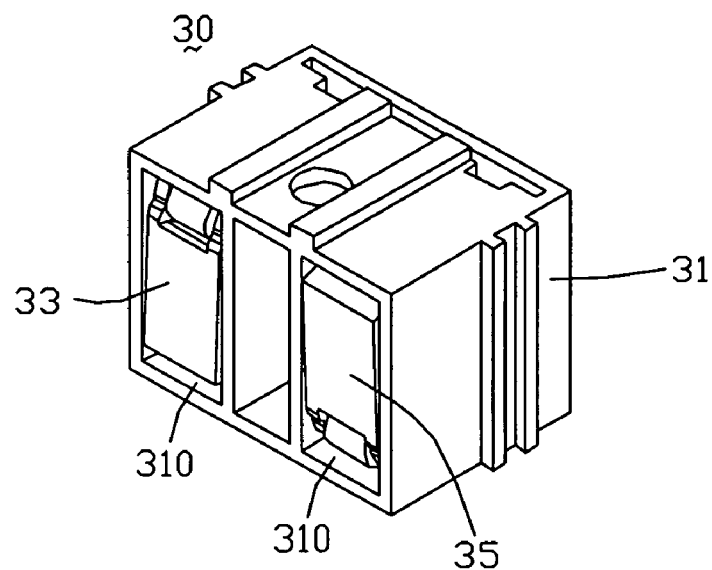
FIG. 5 is an enlarged, isometric view of the locking unit of FIG. 3, but viewed from a rear thereof.
Figure 6:
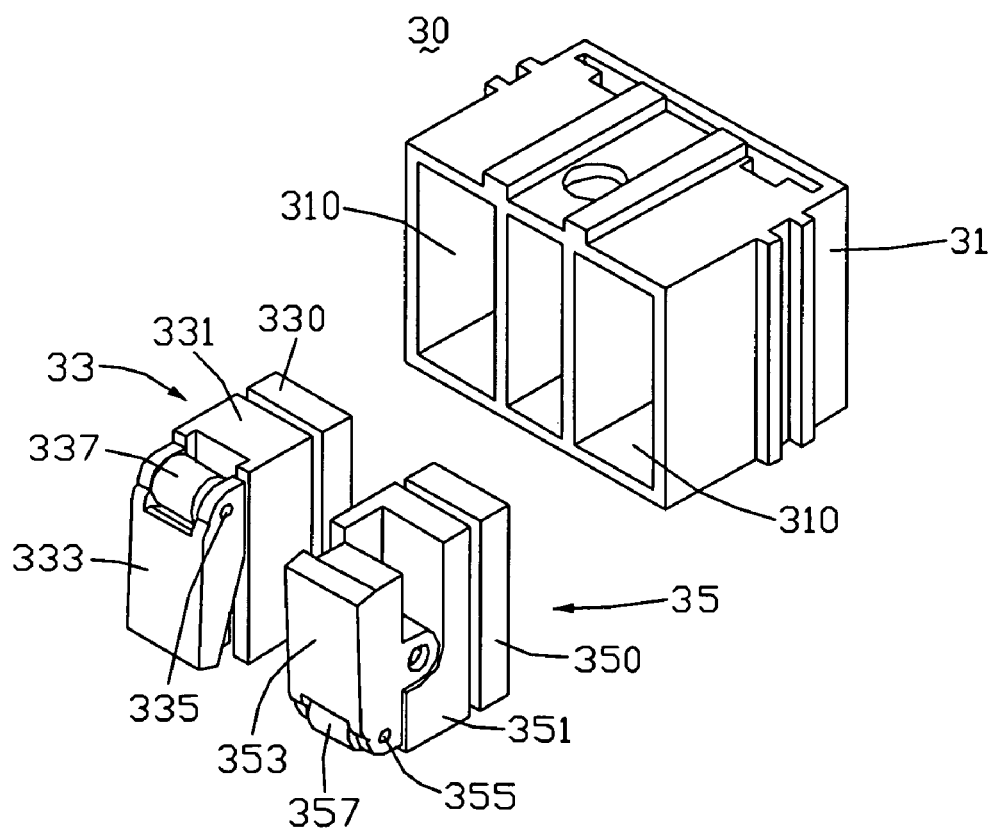
FIG. 6 is an exploded view of the locking unit of FIG. 5, the locking unit including two sliders.

Referring also to FIG. 5 and FIG. 6, the locking unit 30 includes a frame 31, a first slider 33, and a second slider 35. The frame 31 is fitted around the column 29, and can move up and down along the column 29. The frame 31 includes two containing cavities 310. The first and second sliders 33, 35 are accommodated in the two containing cavities 310 respectively. Part of the first slider 33 protruding beyond the corresponding containing cavity 310 is received in the first friction groove 2723 of the friction wall 272 of the support 27, with a rear slide surface of the first slider 33 abutting the base surface of the first friction groove 2723. Part of the second slider 35 protruding beyond the corresponding containing cavity 310 is received in the second friction groove 2725 of the friction wall 272 of the support 27, with a rear slide surface of the second slider 35 abutting the base surface of the second friction groove 2725.

Figure 7:
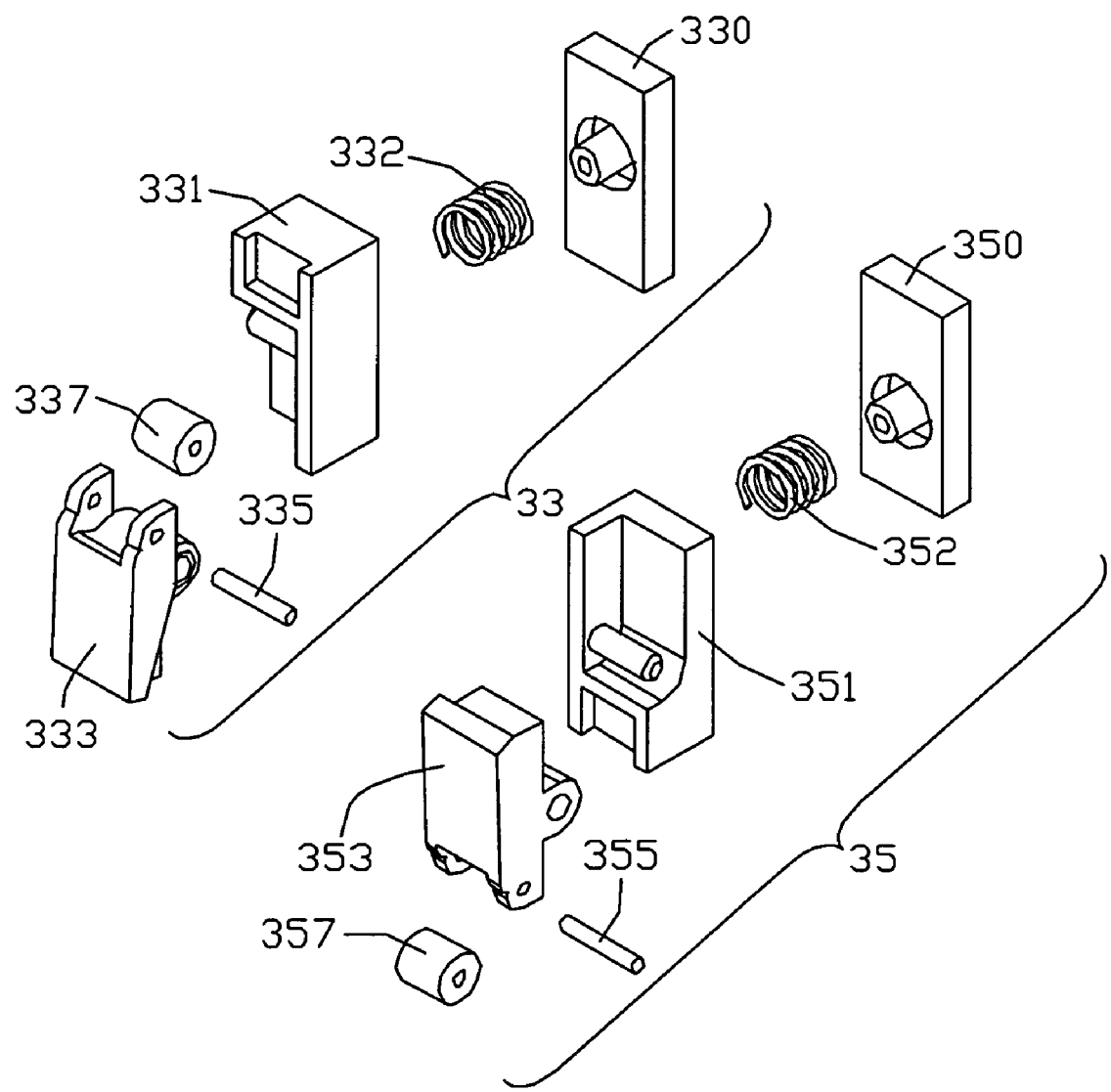
FIG. 7 is an exploded view of the sliders of FIG. 6.
Figure 8:
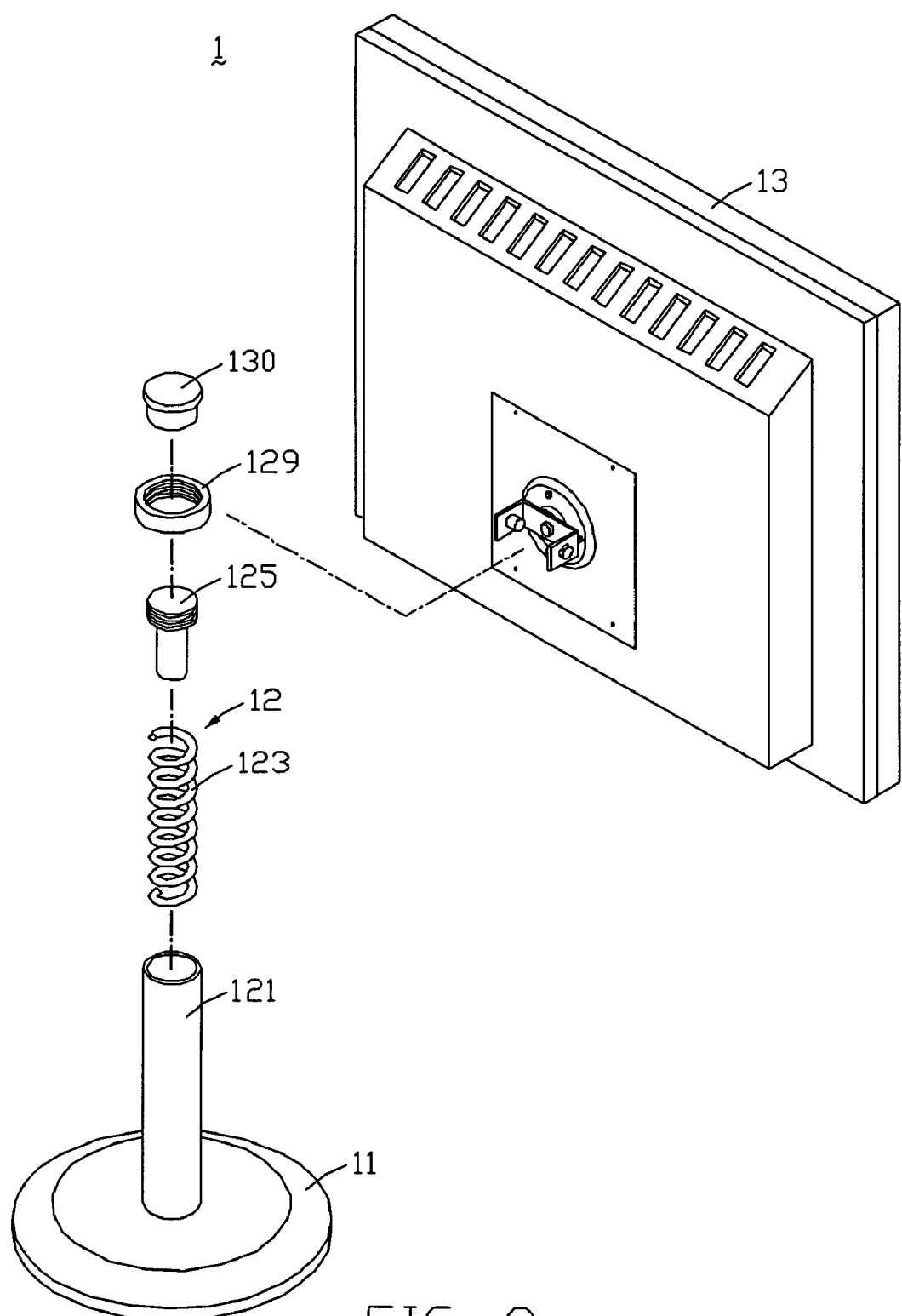
FIG. 8 is an exploded, isometric view of a conventional display apparatus, the display apparatus including a support.
Figure 9:
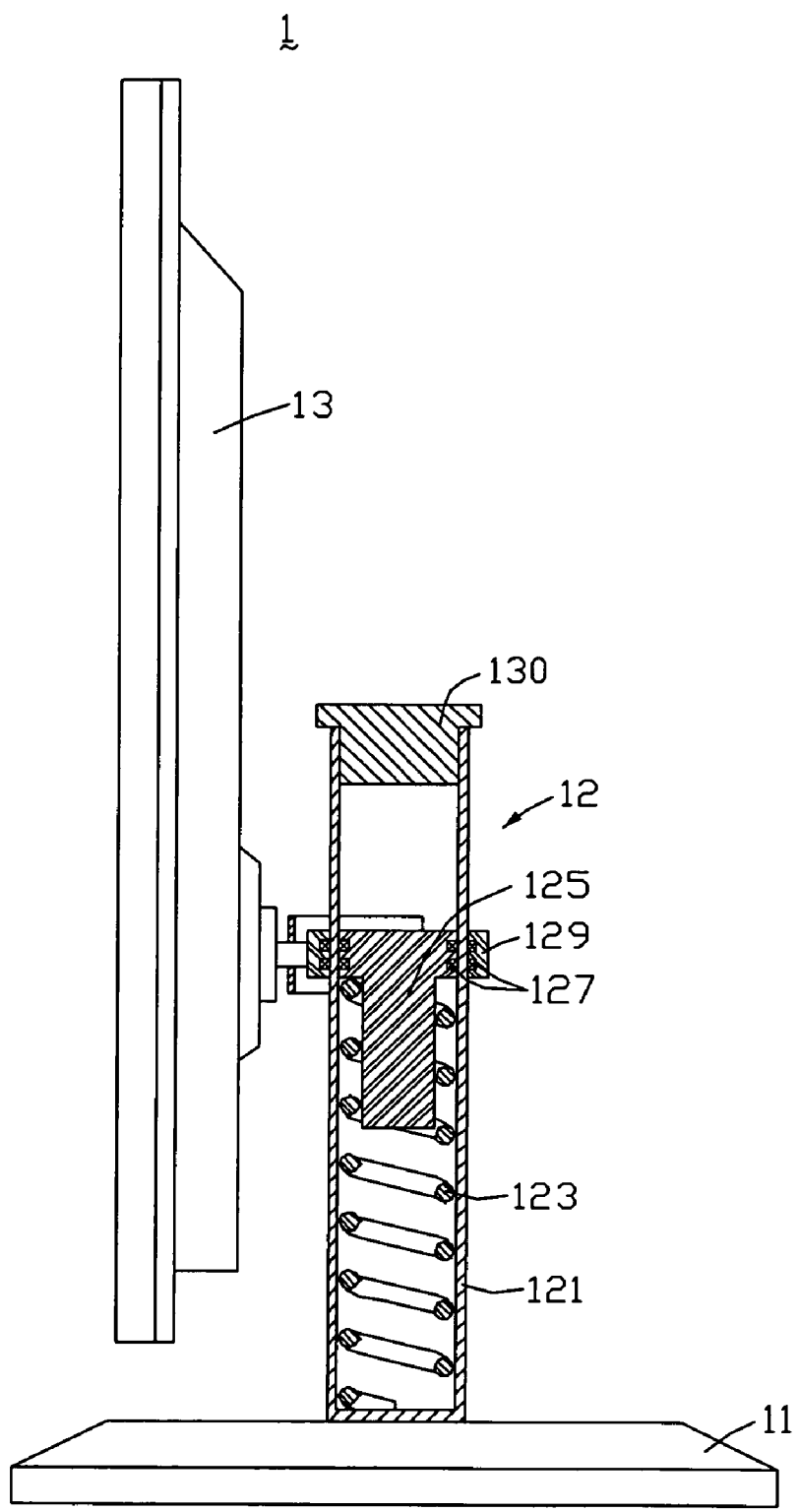
FIG. 9 is a side plan view of the display apparatus of FIG. 8 when fully assembled, showing the support thereof in cross-section.

Referring also to FIG. 7, the first slider 33 includes a first fixing portion 330, a first compression spring 332, a second fixing portion 331, a first rotating portion 333, a first axle 335, and a first roller 337. The first fixing portion 330 is substantially a rectangular block, and is accommodated in the corresponding containing cavity 310. The first fixing portion 330 can be made of resin. The first compression spring 332 spans between the first and second fixing portions 330, 331. The first roller 337 is mounted on a top end of the first rotating portion 333. The first rotating portion 333 together with the first roller 337 is pivoted on the second fixing portion 331 through the first axle 335 such that the first rotating portion 333 and the first roller 337 can be rotated about the first axle 335. Under elastic urging by the first compression spring 332, the first rotating portion 333 and the first roller 337 are received in the first friction groove 2723 of the friction wall 272.

The second slider 35 includes a third fixing portion 350, a second compression spring 352, a fourth fixing portion 351, a second rotating portion 353, a second axle 355, and a second roller 357. The third fixing portion 350 is substantially a rectangular block, and is accommodated in the corresponding containing cavity 310. The third fixing portion 350 can be made of resin. The second compression spring 352 spans between the third and fourth fixing portions 350, 351. The second roller 357 is mounted on a bottom end of the second rotating portion 353. The second rotating portion 353 together with the first roller 357 is pivoted on the fourth fixing portion 351 through the second axle 355 such that the second rotating portion 353 and the first roller 357 can be rotated about the second axle 355. Under elastic urging by the second compression spring 352, the second rotating portion 353 and the second roller 357 are received in the second friction groove 2725 of the friction wall 272.

The height adjusting device 25 is assembled as follows. First, the elastic member 28 and the locking unit 30 are placed into the accommodating space of the support 27, with the frame 31 of the locking unit 30 being fitted around the column 29. The top end of the elastic member 28 is fixed to the locking unit 30. Two opposite side surfaces of the locking unit 30 are received in the first and second U-shaped sliding channels of the support 27. The first and second rotating portions 333, 353, and the first and second rollers 337, 357 of the first and second sliders 33, 35 are received in the first and second friction grooves 2723, 2725 of the support 27, respectively. Then, the support 27 is mounted on the base 26. The first and second rotating portions 333, 353 are configured to ensure that the first rotating portion 333 abuts the base surface of the first friction groove 2723, and the second roller 357 abuts the base surface of the second friction groove 2725; or that the first roller 337 abuts the base surface of the first friction groove 2723, and the second rotating portion 353 abuts the base surface of the second friction groove 2725. That is, the first and second rotating portions 333, 353 do not simultaneously abut the base surfaces of the first and second friction grooves 2723, 2725 respectively; and the first and second rollers 337, 357 do not simultaneously abut the base surfaces of the first and second friction grooves 2723, 2725 respectively.

The working principle of the height adjusting device 25 is as follows:

When the display panel 21 is lifted by a user, the first roller 337 of the first slider 33 abuts the base surface of the first friction groove 2723, and rolls to move up along the first friction groove 2723. Thereby, a downward rolling friction force is generated between the first roller 337 and the first friction groove 2723. However, because a coefficient of rolling friction is very small, the downward rolling friction force can be disregarded. At the same time, the second rotating portion 353 of the second slider 35 abuts and presses the base surface of the second friction groove 2725, thereby generating a pressure N1. Thus, a downward sliding friction force is generated between the second slider 35 and the second friction groove 2725 according the following formula: $F=N1\times\mu$, wherein $\mu$ denotes a friction coefficient between the second slider 35 and the second friction groove 2725. Because the horizontal distance between the base surface of the second friction groove 2725 and the second extending wall 276 increases with increasing height, an elastic force of the second compression spring 352 decreases, and therefore the pressure N1 decreases. Thus, the downward sliding friction force decreases with increasing height.

On the other hand, a force of the elastic member 28 supporting the locking unit 30 decreases with increasing height. By configuring an appropriate relationship between an elastic coefficient of the elastic member 28 and the friction coefficient between the second slider 35 and the second friction groove 2725, when the lifting force applied by the user on the display panel 21 is removed, a sum of the force of the elastic member 28 supporting the locking unit 30 and the downward sliding friction force approaches a predetermined value, e.g., a total force of gravity acting on the display panel 21 and the locking unit 30. Thus, the elastic force of the elastic member 28, the downward sliding friction force, and the total force of gravity acting on the display panel 21 and the locking unit 30 cooperatively maintain the display panel 21 at the current height as desired by the user.

When the display panel 21 is lowered by a user, the first rotating portion 333 abuts and presses the base surface of the first friction groove 2723, thereby generating a pressure N2. Thus, an upward sliding friction force is generated between the first slider 33 and the first friction groove 2723 according the following formula: $F=N2\times\mu$, wherein $\mu$ denotes a friction coefficient between the first slider 33 and the first friction groove 2723. Because the horizontal distance between the base surface of the first friction groove 2723 and the first extending wall 275 increases with decreasing height, an elastic force of the first compression spring 332 decreases, and therefore the pressure N2 decreases. Thus, the upward sliding friction force decreases with decreasing height. At the same time, the second roller 357 of the second slider 35 abuts the base surface of the second friction groove 2725, and rolls to move down along the second friction groove 2725. Thereby, an upward rolling friction force is generated between the second roller 357 and the second friction groove 2725. However, because a coefficient of rolling friction is very small, the upward rolling friction force can be disregarded.

On the other hand, the force of the elastic member 28 supporting the locking unit 30 increases with decreasing height. By configuring an appropriate relationship between the elastic coefficient of the elastic member 28 and the friction coefficient between the first slider 33 and the second friction groove 2723, when the lowering force applied by the user on the display panel 21 is removed, a sum of the force of the elastic member 28 supporting the locking unit 30 and the upward sliding friction force approaches a predetermined value, e.g., the total force of gravity acting on the display panel 21 and the locking unit 30. Thus, the elastic force of the elastic member 28, the upward sliding friction force, and the total force of gravity acting on the display panel 21 and the locking unit 30 cooperatively maintain the display panel 21 at the current height as desired by the user.

Overall, with increasing height of the display panel 21, the force of the elastic member 28 supporting the locking unit 30 decreases, and the downward sliding friction force between the locking unit 30 and the friction wall 272 decreases; and with decreasing height of the display panel 21, the force of the elastic member 28 supporting the locking unit 30 increases, and the upward sliding friction force between the locking unit 30 and the friction wall 272 decreases.

The greatest height of the display panel 21 is obtained when the locking unit 30 abuts the top wall 277 of the support 27, and the least height of the display panel 21 is obtained when the locking unit 30 abuts the stopper 2721. That is, a range of heights along which the display panel 21 can be moved is determined by a height of the stopper 2721 of the support 27 above the base 26, and by a distance between the top wall 277 of the support 27 and the stopper 2721 support.

In summary, the display apparatus 1 uses the friction force between the locking unit 30 and the first and second friction grooves 2723, 2725 of the support to achieve a height adjustable function of the display panel 21 when an external force is applied to the display panel 21, with the display panel 21 being stably maintained at a currently adjusted height when external force applied by a user is removed.

Further or alternative embodiments may include the following. In one example, the first and second locking walls 273, 274 each include an antiskid layer coated on the inner surface thereof. In such case, the antiskid layers are used to enhance the friction force between the locking unit 30 and the support 27. In another example, a material of the first and sliders 33, 35 can be selectable so as to appropriately configure the friction coefficients between the locking unit 30 and the support 27.

It is to be further understood that even though numerous characteristics and advantages of the present embodiments have been set out in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A display apparatus comprising:
   a display panel; and
   a height adjusting device for adjusting a height of the display panel, the height adjusting device comprising:
   a base;
   a supporting member fixed on the base and defining an accommodating space, the supporting member comprising two generally vertical friction grooves, a depth of one of the friction grooves decreasing with increasing height above the base, and a depth of the other friction groove increasing with increasing height above the base;
   a locking unit accommodated in the accommodating space of the supporting member, the locking unit comprising two sliders corresponding to the two friction grooves of the supporting member respectively, one of the sliders abutting a corresponding one of the friction grooves, and the display panel being fixed to the locking unit; and
   an elastic member accommodated in the accommodating space of the supporting member and spanning between the locking unit and the base.

2. The display apparatus in claim 1, wherein only one of the sliders abuts the corresponding one of the friction grooves when the locking unit is moved up.

3. The display apparatus in claim 1, wherein only one of the sliders abuts the corresponding one of the friction grooves when the locking unit is moved down.

4. The display apparatus in claim 1, wherein each slider comprises two fixing portions and a compression spring spanning between the two fixing portions.

5. The display apparatus in claim 4, wherein the slider further comprises a rotating portion, the rotating portion being pivoted on one of the fixing portions through an axle and being accommodated in the corresponding one of the friction grooves.

6. The display apparatus in claim 5, wherein the rotating portion is capable of rotating about the corresponding axle.

7. The display apparatus in claim 6, wherein each slider comprises a roller, the roller being mounted at an end of a corresponding rotating portion and being accommodated in a corresponding one of the friction grooves.

8. The display apparatus in claim 7, wherein each roller is capable of rotating about the corresponding axle and rolling along the corresponding one of the friction grooves.

9. The display apparatus in claim 8, wherein only one of the rollers abuts the corresponding one of the friction grooves when the locking unit is moved up.

10. The display apparatus in claim 8, wherein only one of the rollers abuts the corresponding one of the friction grooves when the locking unit is moved down.

11. The display apparatus in claim 1, wherein the two sliders are provided at a same side of the locking unit and are spaced apart from each other.

12. The display apparatus in claim 11, wherein the supporting member comprises a friction wall, and the two friction grooves are provided on the friction wall.

13. The display apparatus in claim 12, wherein the friction wall further comprises a stopper provided below the friction grooves, the stopper configured to stop the locking unit when the locking unit is moved thereto.

14. The display apparatus in claim 12, wherein the supporting member further comprises two locking walls connected with the friction wall.

15. The display apparatus in claim 14, wherein the supporting member further comprises a top wall connected with the friction wall and the locking walls, all the walls defining the accommodating space.

16. The display apparatus in claim 1, wherein the height adjusting device further comprises a column provided in the accommodating space of the supporting member, the locking unit being fitted around the column and being capable of moving up and down along the column.

17. The display apparatus in claim 16, wherein the elastic member is a compression spring and is fitted around the column thereby supporting the locking unit.

18. The display apparatus in claim 14, wherein each of the locking walls comprises an antiskid layer formed thereon.

\* \* \* \* \*